(12) United States Patent
Cheney et al.

(10) Patent No.: US 7,540,506 B2
(45) Date of Patent: Jun. 2, 2009

(54) TRACKED BICYCLE

(76) Inventors: Dennis Cheney, 485 N. 550 East, Lindon, UT (US) 84042; Fred P. Smith, 228 Scenic Dr., Alpine, UT (US) 84004; Daniel Payne, 5674 W. Prospero La., Herriman, UT (US) 84065

( * ) Notice: Subject to any disclaimer, the term of this patent is extended or adjusted under 35 U.S.C. 154(b) by 403 days.

(21) Appl. No.: 11/444,126

(22) Filed: May 30, 2006

(65) Prior Publication Data

US 2006/0284389 A1 Dec. 21, 2006

Related U.S. Application Data

(63) Continuation of application No. 10/737,107, filed on Dec. 15, 2003, now abandoned, which is a continuation-in-part of application No. 10/020,658, filed on Oct. 29, 2001, now Pat. No. 6,663,117.

(51) Int. Cl.
*B62B 9/04* (2006.01)
(52) U.S. Cl. .................... 280/12.14; 280/12.13; 280/14; 280/12.1
(58) Field of Classification Search ............. 280/12.13, 280/13, 12.14, 12.1, 14, 21.1, 22, 22.1, 845, 280/28.5, 842; 180/9.21, 9, 9.25, 9.1, 9.28, 180/182, 183, 9.3, 190, 9.42, 184, 193
See application file for complete search history.

(56) References Cited

U.S. PATENT DOCUMENTS

| | | |
|---|---|---|
| 526,556 A | 9/1894 | Bolton |
| 541,426 A | 6/1895 | Detreux |
| 654,291 A | 7/1900 | Stith |
| 1,261,204 A | 4/1918 | Barton |
| 1,281,980 A | 10/1918 | Kostewich |
| 1,318,166 A | 10/1919 | Matheus |
| 3,336,994 A | 8/1967 | Pederson |
| 3,592,279 A | 7/1971 | Donelson |
| 3,872,938 A | 3/1975 | DeGroot |
| 3,915,468 A | 10/1975 | Hoareau |
| 4,699,229 A | 10/1987 | Hirose et al. |
| 4,719,983 A | 1/1988 | Bruzzone |
| 4,823,903 A | 4/1989 | Bibollet et al. |
| 5,102,153 A | 4/1992 | Rhode |
| 5,423,559 A | 6/1995 | Rhode |
| 5,433,466 A | 7/1995 | Timmer |
| 5,474,146 A | 12/1995 | Yoshioka et al. |
| 5,738,361 A | 4/1998 | Landucci |
| 5,904,217 A | 5/1999 | Yamamoto et al. |
| 6,123,353 A | 9/2000 | Bennett et al. |
| 6,164,670 A | 12/2000 | Abarca et al. |
| 6,279,923 B1 | 8/2001 | Cardillo et al. |
| 6,361,032 B1 | 3/2002 | Lawson |

(Continued)

*Primary Examiner*—Christopher P Ellis
*Assistant Examiner*—Brian Swenson
(74) *Attorney, Agent, or Firm*—Thorpe North & Western LLP

(57) ABSTRACT

A tracked vehicle, or a kit for converting a standard bicycle into a tracked cycle, includes a track assembly with a bogie assembly for riding on snow, mud, sand, etc. The track assembly includes a continuous track movably disposed about a drive wheel coupled to a frame of the vehicle or bike, and a bogie wheel disposed rearward of the drive wheel. The bogie assembly includes a pair of arms coupling the bogie wheel to the frame of the vehicle or bike in a cantilever fashion.

18 Claims, 9 Drawing Sheets

U.S. PATENT DOCUMENTS

| | | |
|---|---|---|
| 6,431,301 B1 | 8/2002 | Forbes |
| 6,431,570 B1 | 8/2002 | Lennon et al. |
| 6,511,079 B1 | 1/2003 | Charles, Sr. |
| D480,337 S | 10/2003 | Wanser et al. |
| 6,663,117 B2 | 12/2003 | Cheney et al. |
| 7,232,130 B2 * | 6/2007 | Reeves ........................ 280/7.1 |

* cited by examiner

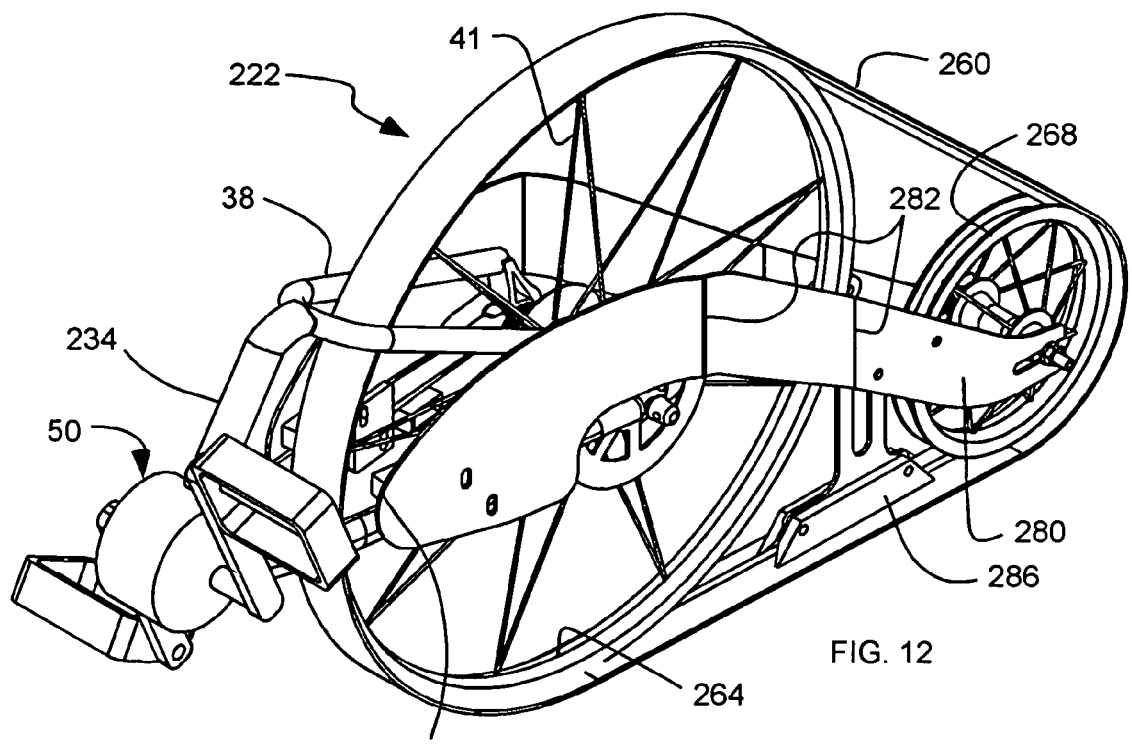
FIG. 12
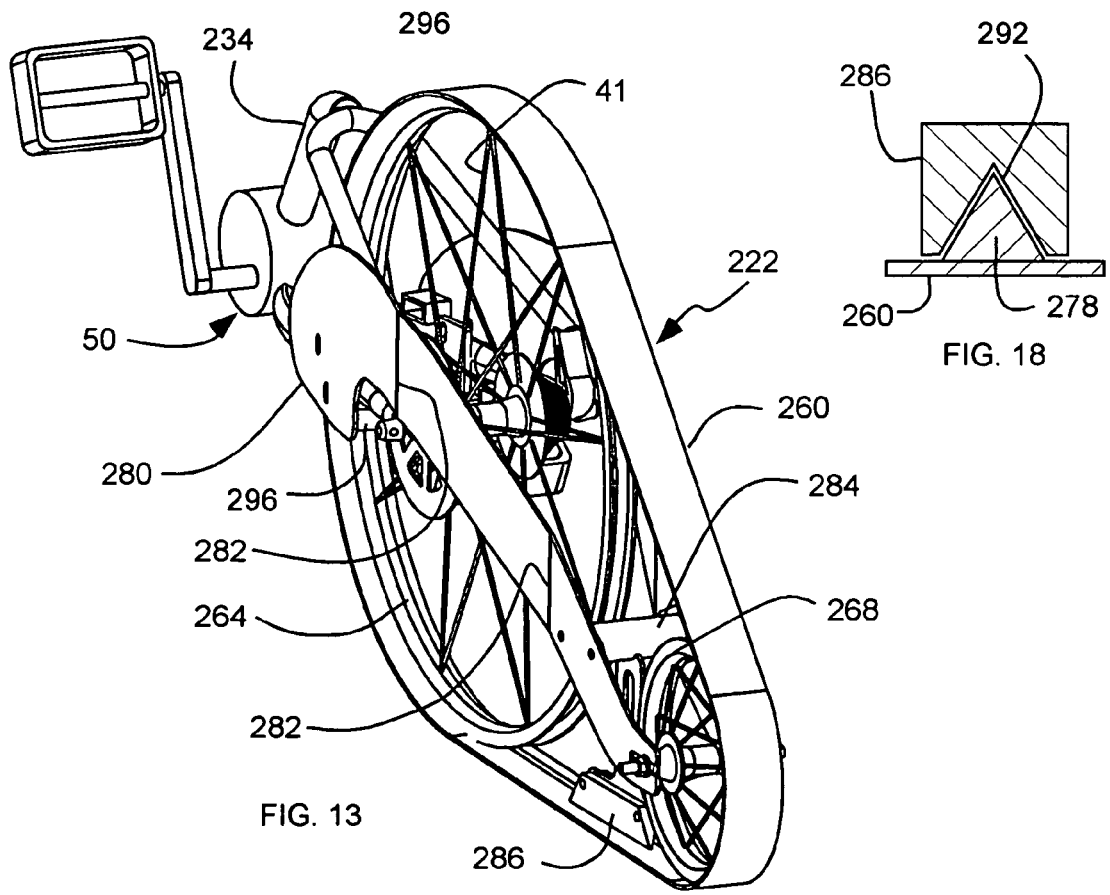
FIG. 13
FIG. 18

TRACKED BICYCLE

This application is a continuation of U.S. patent application Ser. No. 10/737,107, filed Dec. 15, 2003 now abandoned; which is a continuation-in-part of U.S. Pat. No. 6,663,117, filed Oct. 29, 2001, as U.S. patent application Ser. No. 10/020,658; which are herein incorporated by reference.

BACKGROUND OF THE INVENTION

1. Field of the Invention

The present invention relates generally to tracked vehicles. More particularly, the present invention relates to a tracked bicycle for use on snow, sand, mud, etc.

2. Related Art

Mountain biking, off-road bicycling, and/or bicycling in and around nature have become popular sports or pastimes. Bikers or cyclists often enjoy riding in wilderness or natural environments, such as the woods, sand dunes, red-rocks, etc. Such environments can provide a welcome change from city or suburban environments. In addition, such environments can provide unique and challenging riding conditions, including steep uphill climbs, steep downhill descents, sharp curves, etc. Some wilderness or natural environments are provided with bike trails. Such trails can be simple paths in the dirt or sand, while others can be graded or covered with gravel, while still others may be paved. Another unique and challenging riding condition of the wilderness or natural environments is obstacles, such as larger rocks, fallen tree trunks, streams and rivers, mud, sand dunes, etc. These natural conditions provide additional enjoyment and challenge to the cycling experience.

Such bicycling or cycling is often dependent on weather conditions, or seasons. While some areas or locations allow for year-round riding, other areas can be limited to the spring, summer and fall months. For example, many popular riding areas are located in the mountains, where annual winter snowfall prohibits riding off-road or on non-maintained trails. In addition, it will be appreciated that most maintained roads are for motor vehicles, and that sharing a road with such motor vehicles in winter conditions can be extremely dangerous. Therefore, even the most ardent mountain bikers tend to store their bikes for the winter and opt for either in-door stationary bicycles, alternative winter sports such as snowshoeing or cross-country skiing, or simple waiting out the winter.

Some efforts have been made to continue mountain biking in the winter. For example, bicycles have been proposed with "fat" or wide tires to prevent sinking into the snow. Such bicycles have special, wide frames to accommodate the fat or wide tires. Thus, the rider must invest in another bicycle with this approach. As another example, standard mountain bikes have been proposed with special tires that have spikes or studs. Such tires tend to be thin enough to sink into the snow. As a further example, devices have been proposed with a seat disposed on front and rear skis. Such devices, however, are suitable only for coasting down a slope, and are not provided with any means of propulsion.

Various tracked, off-road, recreational vehicles have been proposed. Such vehicles have a continuous track, similar to tank tracks, as opposed to, or in addition to, wheels. While some tracks have been used for motor powered vehicles, such as all-terrain-vehicles (ATVs), it is not readily apparent how to adapt such tracks for use with human-powered vehicles, such as bicycles. Some tracks have been proposed for use with human-powered vehicles, but are cumbersome, awkward, and require special modifications to the bicycle.

In addition, other areas or locations have riding conditions for which typical mountain bikes are ill suited. For example, mud and sand can be as difficult to ride in as snow. Tires tend to slip and spin in both mud and sand. In addition, the tires can sink into both mud and sand.

SUMMARY OF THE INVENTION

It has been recognized that it would be advantageous to develop a bicycle capable of being realistically operated in conditions or environments such as snow, mud, sand, etc. In addition, it has been recognized that it would be advantageous to develop a bicycle with improved traction and buoyancy with respect to the riding surface. In addition, it has been recognized that it would be advantageous to develop a bicycle which can be operated in different conditions, or which can be easily converted for use in different conditions, such as both hard dirt and snow.

The invention provides a tracked vehicle, or a kit for converting a standard bicycle into a tracked cycle. The kit or vehicle includes a track assembly with a bogie assembly for riding on snow, mud, sand, etc. The track assembly includes a continuous track movably disposed about a drive wheel coupled to a frame of the vehicle or bike, and a bogie wheel disposed rearward of the drive wheel. The bogie assembly includes a pair of arms coupling the bogie wheel to the frame of the vehicle or bike in a cantilever fashion.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIGS. 12 and 13 are perspective views of the track assembly of FIG. 10;

FIG. 18 is a detailed cross-sectional view of the track of FIG. 10.

DETAILED DESCRIPTION

Figure 1:
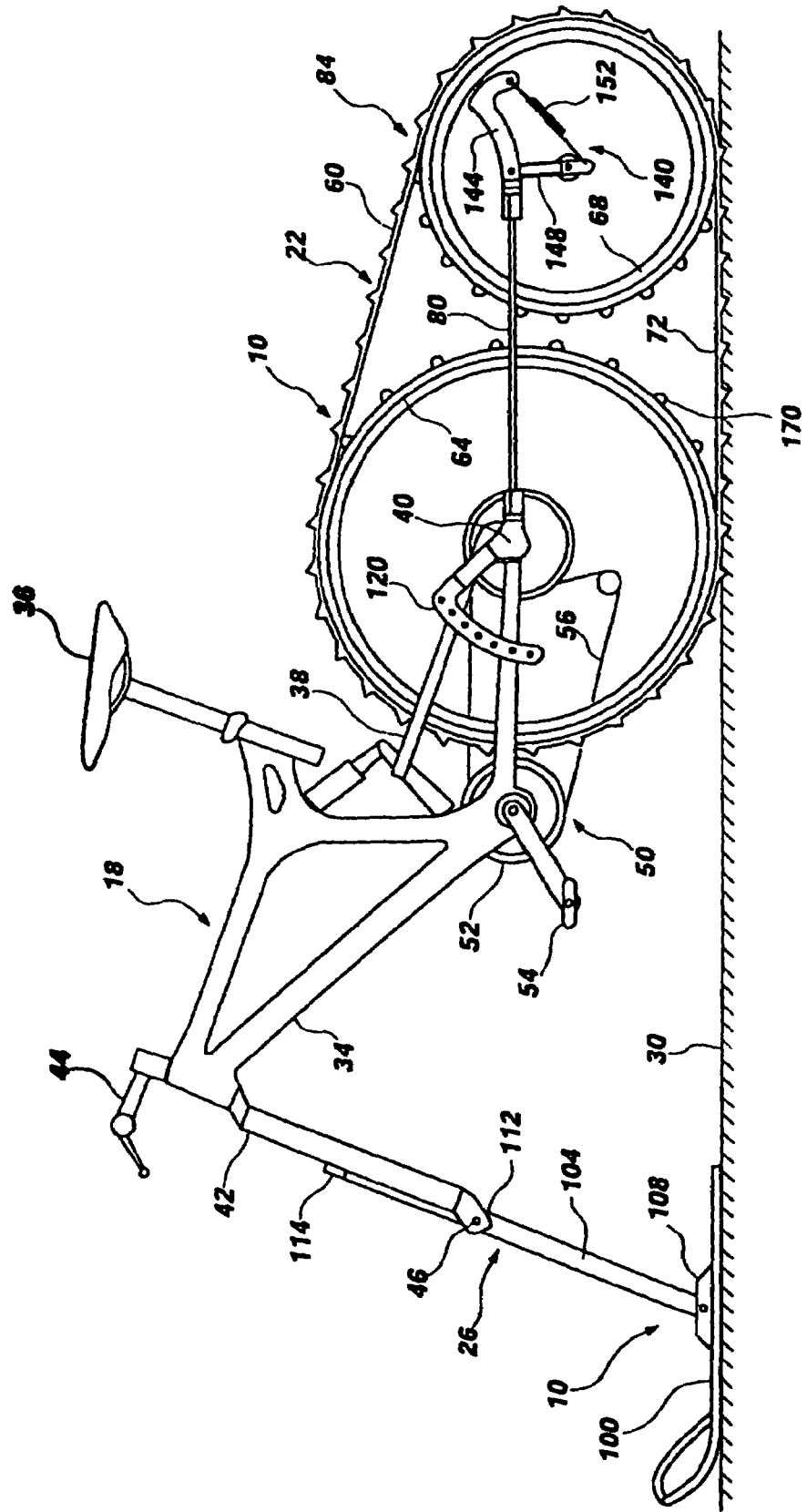
FIG. 1 is a side view of a standard bicycle with a kit having a track assembly and front ski in accordance with the present invention installed thereon to form a tracked vehicle in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a kit 10 in accordance with the present invention is shown installed on a standard bicycle 14 (FIG. 7) to convert it into a tracked cycle or tracked vehicle 18. Mountain bikes, mountain biking, bicycles, cycling and human-powered vehicles are examples of fields that may benefit from the use of such a kit 10 or tracked vehicle 18. The kit 10 can include a track assembly 22 and a ski assembly 26 that advantageously can be installed on the standard bicycle 14 (FIG. 7) to create a tracked vehicle 18 with improved traction and/or buoyancy on a riding surface 30, such as snow, mud, sand, etc. Thus, the performance or function of a standard bicycle or human powered vehicle can be improved for certain riding conditions, enhancing or extending the riding experience. In addition, the kit 10 allows a user or rider to use a single vehicle or bicycle for both wheeled and tracked applications.

While the kit 10 of the present invention is shown and configured for use with a standard bicycle, it is of course understood that the kit can be configured for use with other types of human-powered vehicles, or bicycles with different configurations, such as recumbent bicycles or different frame configurations. In addition, it is understood that while the kit is shown and configured for use with human-powered vehicles, it can be configured for used with powered or motor vehicles. Furthermore, it is understood that while the kit, or track and ski assemblies, are shown as accessories for being removably coupled to a standard bicycle, the track and/or ski assemblies can be permanently or integrally provided on a vehicle to form a dedicated tracked vehicle.

Figure 7:
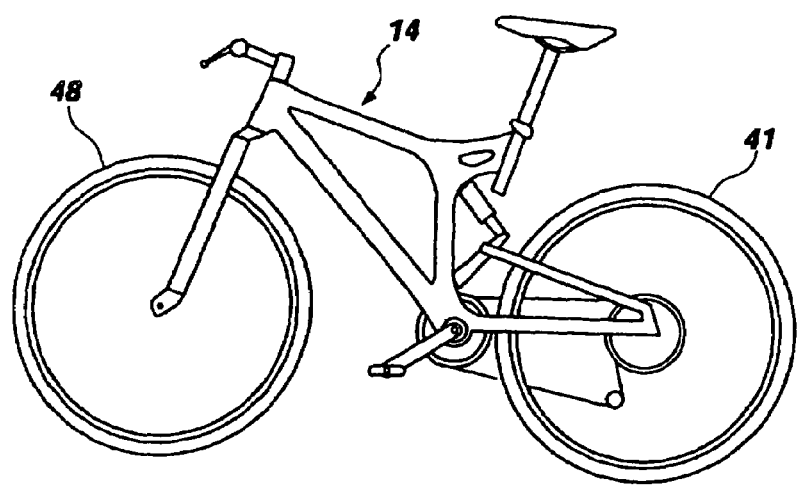
FIG. 7 is a side view of a standard bicycle.

Referring to FIGS. 1 and 7, the bicycle 14 or tracked vehicle 18 preferably has a frame 34 with a seat 36 to support a rider and a rear fork (or rear stays) 38. The rear fork 38 can have a rear axle location 40 where a rear wheel 41 (FIG. 7) can be rotatably coupled to the frame 34. Preferably, a front fork 42 is pivotally coupled to the frame 34, and attached to a handlebar 44 for a user to grasp and pivot the front fork 42. The front fork 42 also can have a front axle location 46 where a front wheel 48 (FIG. 7) can be rotatably coupled to the front fork 42 or frame 34. A drive assembly 50 can be coupled to the frame 34, and can include a peddle gear 52 rotatably coupled to the frame 34, peddles 54 attached to the peddle gear 52 to allow a rider to rotate the peddle gear, and a drive chain 56 operative disposed around the peddle gear 52 to transfer the rotation and/or force of the peddles gear.

Figure 2:
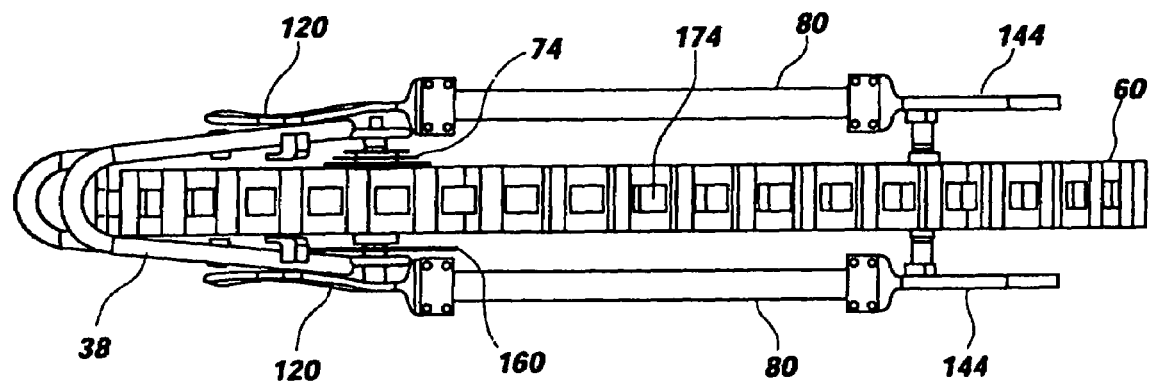
FIG. 2 is a top view of the track assembly of FIG. 1.

Referring to FIGS. 1 and 2, the track assembly 22 includes a continuous track 60 movably disposed around a pair of opposite, spaced-apart wheels, including a drive wheel 64 and a bogie wheel 68. The drive wheel 64 turns or drives the track 60, while the bogie wheel 68 allows an elongated portion 72 of the track 60 to contact the riding surface 30. The elongated portion 72 of the track 60 increases the surface area of the track 60 contacting the riding surface 30 to improve traction and buoyancy. As discussed in greater detail below, the bogie wheel 68 advantageously is flexibly and resiliently coupled to the frame 34 or drive wheel 64, and biased towards the riding surface 30, to improve traction. Preferably, the track assembly 22 is removably coupled to the frame 34 so that the track assembly can be selectively coupled and uncoupled from the frame 34. Thus, the track assembly 22 can be selectively coupled to the frame 34 to convert the standard bicycle 14 (FIG. 7) into the tracked cycle or vehicle 18.

The track 60 can be formed of a flexible material so that it can travel around the drive and bogie wheels 64 and 68. Protrusions can extend outwardly from the track 60 to increase traction or prevent slippage of the track with respect to the riding surface 30. The track 60 can be an integral, continuous loop, or can be separable. The track 60 preferably has a width sized to extend substantially across the available width between the rear fork 38. Thus, the track 60 can be utilized with a standard bicycle 14 (FIG. 7), and maximize surface area and buoyancy on the riding surface 30, such as snow.

The drive wheel 64 is rotatably coupled to the frame 34 or rear fork 38. Preferably, the drive wheel 64 is removably coupled to the frame 34 or rear fork 38 so the drive wheel 64 can be selectively coupled and uncoupled from the frame. In addition, the drive wheel 64 preferably is coupled at the rear axle location 40 of the rear fork 38, or has a drive axle coupled at the rear axle location, much like a typical rear wheel. The drive wheel 64 can have one or more drive gears 74 (FIG. 2) that are operatively engaged by the drive chain 56 such that a rider peddling the peddles 54 drives the drive wheel 64 through the peddle gear 52 and drive chain 56. Coupling the drive wheel 64 at the rear axle location 40 advantageously allows the drive assembly 50 of a standard bicycle to also drive the drive wheel 64.

The bogie wheel 68 preferably is disposed rearward of, and spaced-apart from, the drive wheel 64. One or more flexible and resilient arms 80 advantageously couple the bogie wheel 68 to the frame 34. Preferably, a pair of arms 80 is coupled to and between the frame 34 and the bogie wheel 68, each one on an opposite side of the bogie wheel. The arms 80 have a first end attached to the frame 34, and a second end coupled to the bogie wheel 68. Thus, the bogie wheel 68 is attached to the frame 34 in a cantilever configuration. The bogie wheel 68 and arms 80 form a bogie assembly or apparatus 84 for use with the track 60 or track assembly 22 of the tracked vehicle 18.

Figure 3:
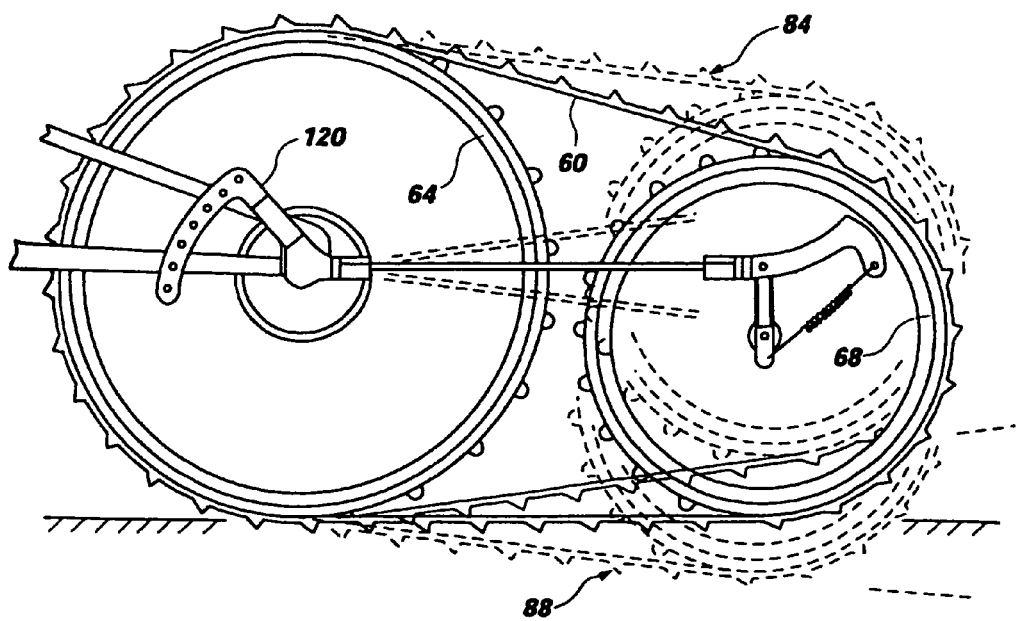
FIG. 3 is a side view the track assembly of FIG. 1 showing multiple positions of the track assembly.

Referring to FIG. 3, the arms 80 are compliant and resilient to allow the bogie wheel 68 to move or pivot with respect to the frame 34. Thus, the bogie wheel 68 can move upward or downward in response to the riding surface 30, or riding conditions. For example, the bogie wheel 68 and track 60 can displace upwardly, indicated at 84 by dashed lines. In addition, the arms 80 exert a force against the bogie wheel 68, and thus the track 60, to force the track 60 against the riding surface 30 to improve traction. For example, in softer snow, the bogie wheel 68 and track 60 can deflect downwardly, indicated at 88 by dashed lines, to maintain contact with the snow as it compresses. The arms 80 bend or deflect as the bogie wheel 68 moves or pivots.

Figure 4:
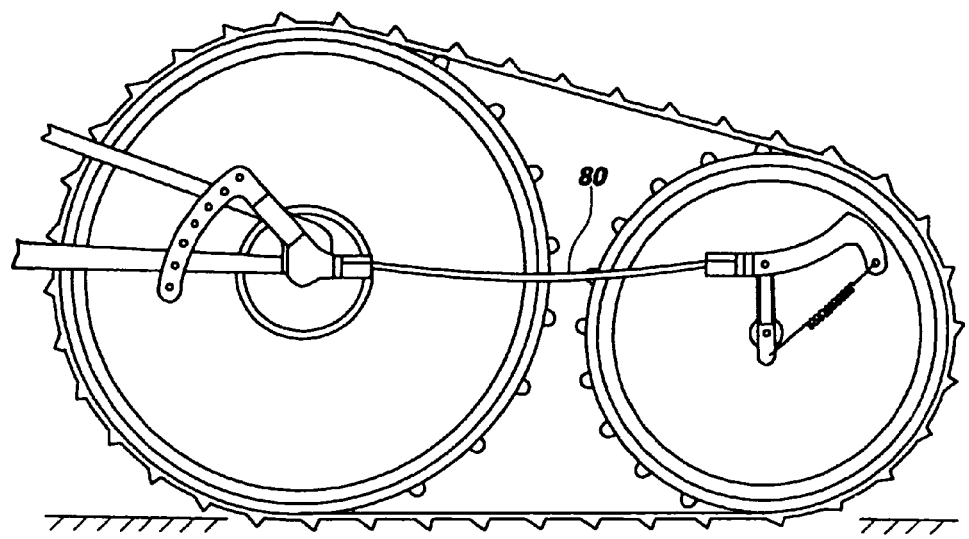
FIG. 4 is a side view of the track assemble of FIG. 3.

Referring to FIG. 4, the arms 80 can be pre-loaded to exert a predetermined amount of force against the bogie wheel 64. Thus, the track 60 exerts a predetermined amount of force against the riding surface 30. The arms 80 preferably exert a force when the track assembly 22 or bogie wheel 64 is in a normal configuration or position, such as when the track assembly 22, or lower portion 72 thereof, and the ski align on a flat riding surface. Thus, the arms 80 can be bent to exert a force in the normal configuration. It has been determined that the arms preferably exert approximately 5-25 pounds of force for approximately 1-3 inches of deflection.

The arms 80 preferably are formed of a flexible and resilient material. Thus, the arms 80 form springs or bows, attaching the bogie wheel 64 to the frame 34. In one aspect, the arms 80 are composite arms formed of a composite material, such as pultruded fiberglass. For example, the compliant arms 80 may be formed of 1.25"×0.25" bars of pultruded fiberglass. The pultruded fiberglass can include glass fibers densely packed and embedded in a polyester resin. In one aspect, the material of the arms 80 has a modulus of elasticity between approximately 3 and 6 Msi; more preferably between approximately 3 and 5 Msi; and most preferably between approximately 3 and 4 Msi. It is of course understood that such specifications are dependent on the specific dimensions of the arm.

In addition to the track assembly 22, the kit 10 also preferably includes a ski assembly 26. The ski assembly 26 preferably is removably coupled to the front fork 42. The ski assembly 26 includes a ski 100 coupled to the front fork 42. An elongated ski post 104 can be removably attachable to the front fork 42, and extend to a connector 108 on a lower end thereof to pivotally couple to the ski 100. The ski post 104 can include a lower mounting bracket 112 attachable to the front axle location 46 of the front fork 42, and an upper mounting bracket 114 attachable to the front fork 42, or to a brake location of the front fork. The ski post 104 allows the front fork of a standard bicycle to be used with the ski 100.

Figure 5:
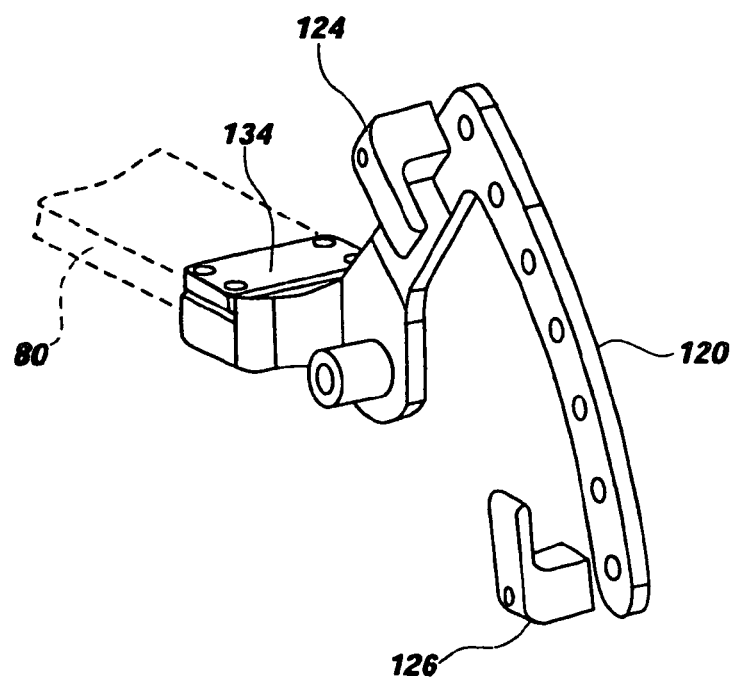
FIG. 5 is a perspective view of a bracket in accordance with the present invention for attaching the track assembly or a bogie wheel to the bicycle.
Figure 6:
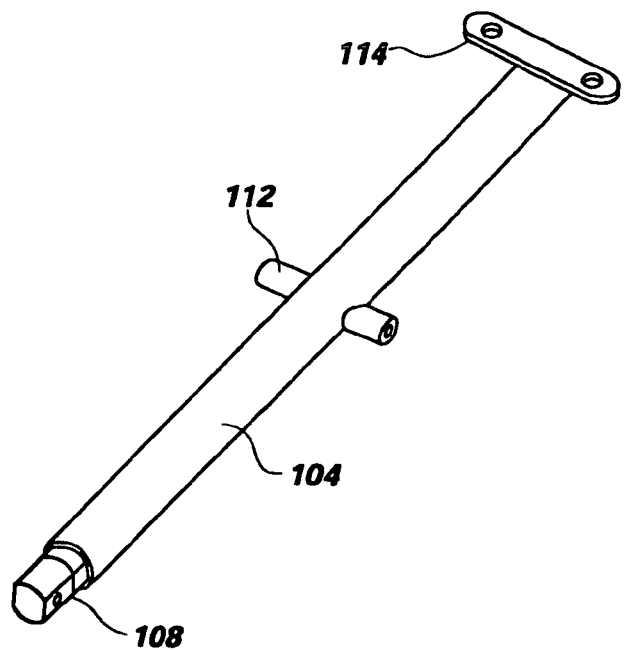
FIG. 6 is a perspective view of a ski post in accordance with the present invention for attaching a ski to a front fork of a bicycle.
Figure 8:
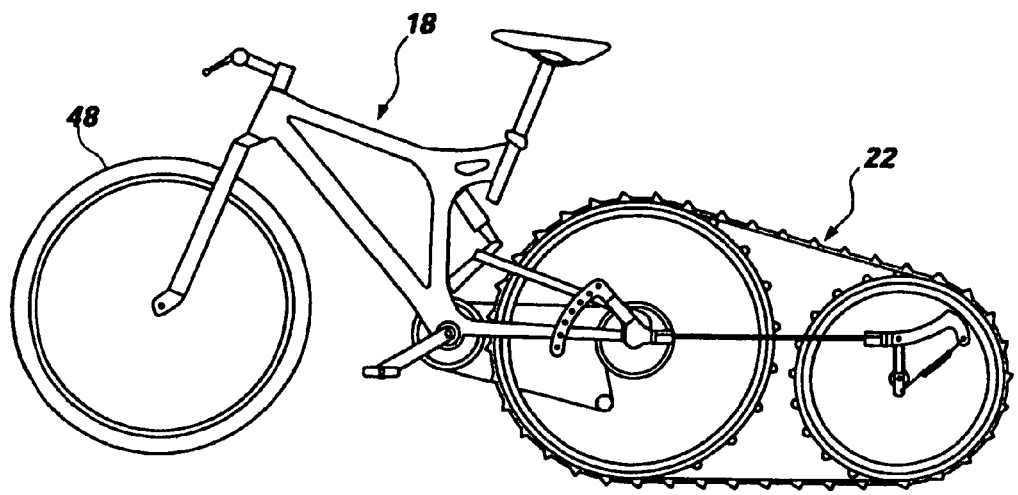
FIG. 8 is a side view of the standard bicycle of FIG. 7 with a track assembly in accordance with the present invention installed thereon to form a tracked vehicle in accordance with the present invention.
Figure 9:
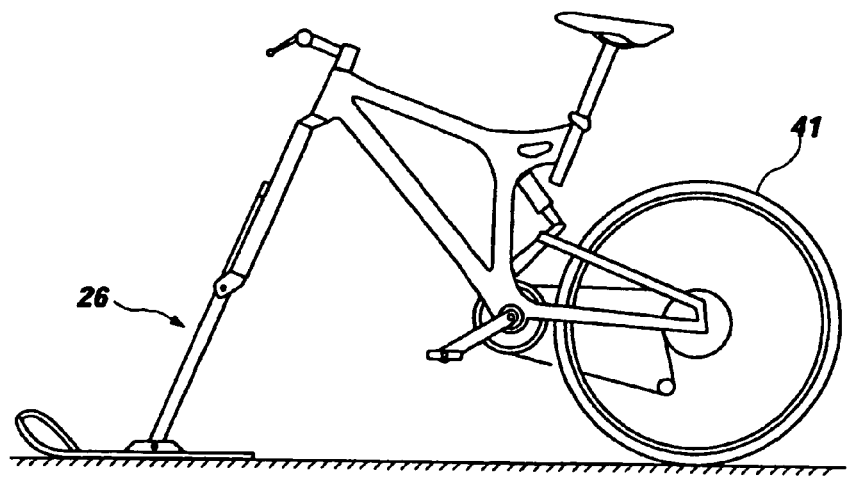
FIG. 9 is a side view of the standard bicycle of FIG. 7 with a ski assembly in accordance with the present invention installed thereon to form a skied vehicle in accordance with the present invention.
Figure 10:
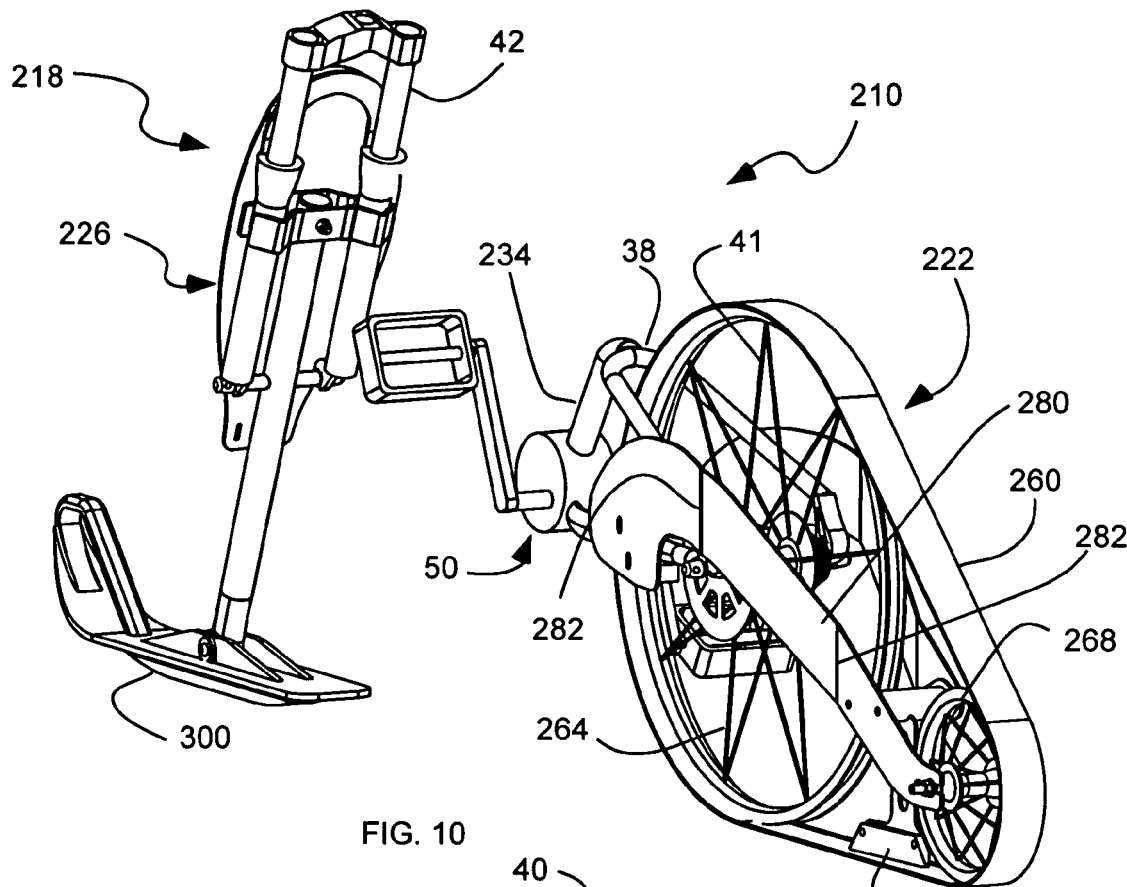
FIG. 10 is a perspective view a kit having a track assembly and front ski in accordance with the present invention shown on a standard bicycle (partially shown) to form a tracked vehicle in accordance with the present invention.
Figure 11:
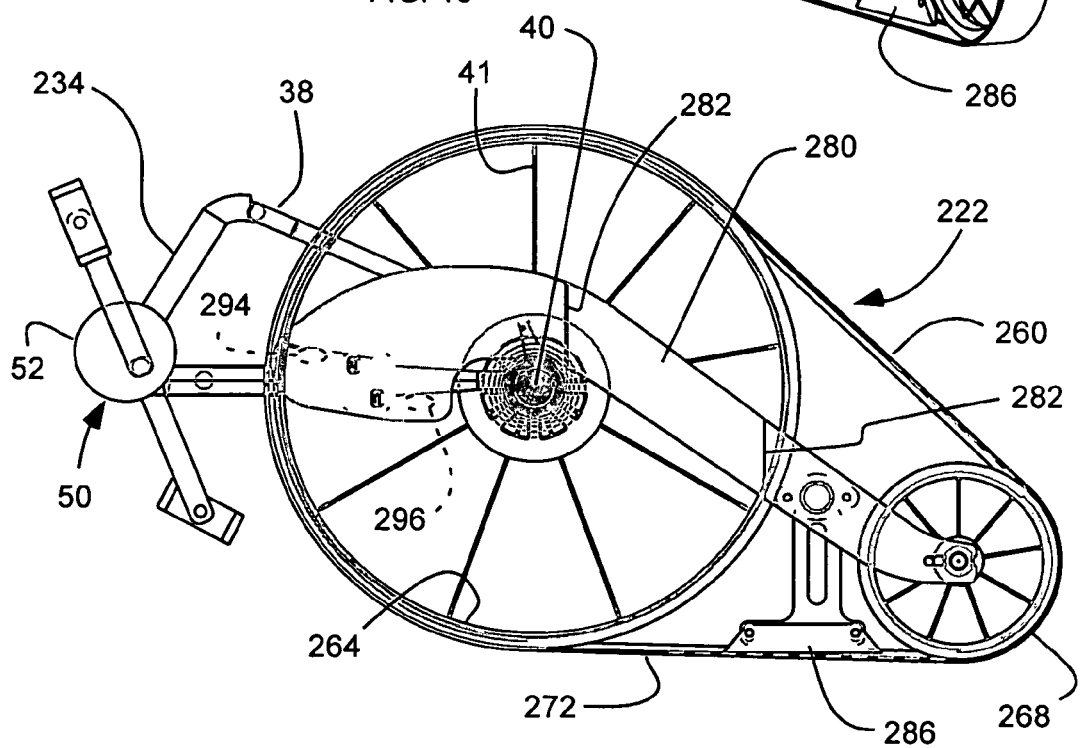
FIG. 11 is a side view of the track assembly of FIG. 10.
Figure 14:
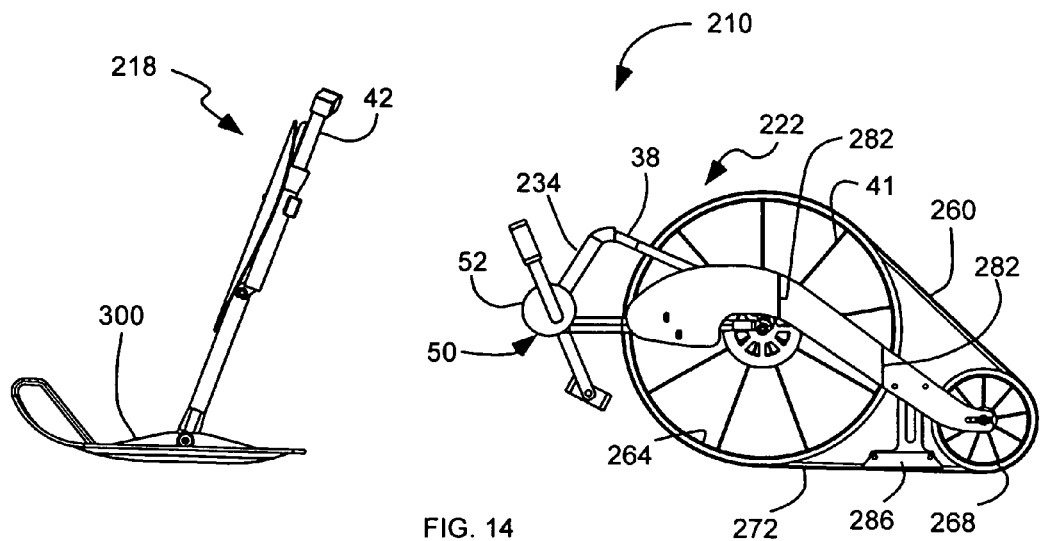
FIG. 14 is a side view of the kit shown in FIG. 10.
Figure 15:
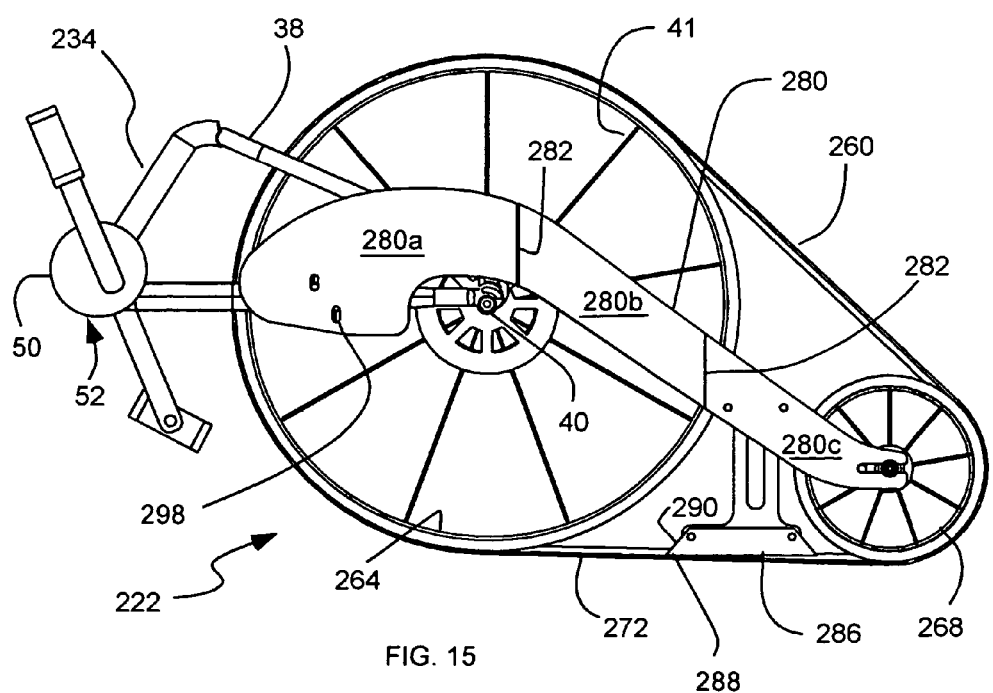
FIG. 15 is a side view of the track assembly of FIG. 10.

Referring to FIGS. 1 and 5, the track assembly 22 can be attached to the frame in any appropriate manner. As an example, a universal bracket can be used which is configured to removably attach the track assembly 22 to a number of different frame configurations, or rear fork configurations. One or more frame brackets 120 can have a vertically oriented portion to be disposed adjacent the rear fork 38. One or more braces, such as upper and lower braces 124 and 126, can be adjustably attached to the frame bracket 120 to clamp the rear fork 38 between the braces 124 and 126 and the bracket 120. The upper brace 124 can clamp an upper member of the rear fork 38 to the bracket 120, while the lower brace 126 can clamp a lower member of the rear fork 38 to the bracket 120. As shown, the frame bracket 120, or vertically oriented portion thereof, can be elongated to extend across the rear fork 38 of different frame configurations. In addition, the braces 124 and 126 can be selectively secured along the bracket 120, such as along a plurality of holes, to adjust for different frame configurations. A hole 130 can be formed in the bracket 120 to receive the axle of the drive wheel 64.

The arms 80 can be attached directly to the brackets 120, thus coupling the bogie wheel 68 to the brackets 120 and the frame 34. The first ends of the arms 80 can be attached to a horizontal portion of the brackets 120, such as by clamping between the bracket 120 and a clamp plate 134.

The drive wheel 64 can be attached directly to the rear fork 38 of the frame 34. Preferably, the drive wheel 64 is located at the rear axle location 40, similar to the standard rear wheel 41 (FIG. 7), so that the drive wheel 64 can be coupled to the drive chain 56 without further modification of the drive assembly 50. Alternatively, the drive wheel 64 can be attached to the bracket 120 so that the entire track assembly 22 can be attached and removed as a unit.

Referring to FIGS. 1 and 4, the track assembly 22 or the bogie assembly 84 can include a tensioner or tension mechanism 140 to maintain tension on the track 60 between the drive and bogie wheels 64 and 68. The tensioner 140 can movably couple the bogie wheel 68 to the arms 80. Thus, the tensioner 140 can move the bogie wheel 68 away from the drive wheel 64 as the bogie wheel 68 pivots with respect to the frame. It will be appreciated that as the bogie wheel 68 pivots with respect to the frame, the arms 80 cause the bogie wheel 68 to move slightly closer to the frame, thus decreasing tension on the track 60. The tensioner 140 moves the bogie wheel 68 away from the frame to maintain tension.

For example, the tensioner 140 can include a bogie bracket 144 attached to the second end of the arm 80 opposite the frame or frame bracket. A pivot bar 148 has a first end pivotally attached to the bogie bracket 144 so that the pivot bar pivots with respect to the bogie bracket 144 towards and away from the bogie bracket, and pivots towards and away from the frame. The bogie wheel 68 is coupled to the second end of the pivot bar 148 so that the bogie wheel 68 is movable with respect to the bogie bracket 144, and thus the arms 80. The bogie wheel 68 is biased away from the frame. A spring 152 is coupled between the bogie bracket 144 and the pivot bar 148. The spring can extend from a protrusion on the bogie bracket, which extends away from the frame, and the second end of the pivot bar. Thus, the spring 152 pulls the pivot bar 148 and the bogie wheel 68 away from the frame and tensions the track 60.

The tracked vehicle 18 preferably has two or more configurations, including a wheeled configuration, as shown in FIG. 7, and a tracked configuration, as shown in FIG. 1. Referring to FIG. 7, the vehicle can be a standard bicycle 14. The rear wheel 41 is coupled to the rear fork 38 at the rear axle location 40, and coupled to the drive chain 56 of the drive assembly 50. In addition, the front wheel 48 preferably is coupled to the front fork 42 at the front axle location 46.

Referring to FIG. 1, in the tracked configuration, the track assembly 22 is coupled to the frame 34 or rear fork 38, preferably at the rear wheel location 40. The drive chain 56 of the drive assembly 50 is operatively coupled to drive wheel 46. In addition, the ski 100 or ski assembly 26 preferably is coupled to the front fork 42.

It will be appreciated that the other configurations are possible. For example, referring to FIG. 8, the tracked assembly 22 can be coupled to the rear fork 38, and the front wheel 48 can be coupled to the front fork 42. Such a configuration can be useful for riding in mud or sand. As another example, referring to FIG. 9, the ski assembly 26 can be coupled to the front fork 42, and the rear wheel 41 can be coupled to the rear fork 38. Such a configuration can be useful in other riding conditions. Thus, the kit 10 of the present invention advantageously is capable of providing multiple different vehicle configurations, as shown in FIGS. 1 and 7-9.

It will be appreciated that the standard brakes associated with the standard bicycle 14 (FIG. 7) can be removed or may be inoperable for the tracked vehicle 18 or the tracked configuration. Thus, referring to FIG. 2, the track assembly 22 can include a disk brake 160 attached to the drive wheel 64 to provide braking. The tracked vehicle 18 can utilize a hydraulic brake which engages the disk brake 160.

Referring to FIGS. 1 and 2, the drive wheel 64 can have a plurality of teeth or protrusions 170 formed thereon which mate with a plurality of apertures 174 formed in the track 60. The teeth and apertures 170 and 174 resist slipping between the drive wheel 64 and track 60. Alternatively, teeth can be formed on the track to mate with indentations in the drive wheel. Similar teeth can be formed in the bogie wheel 68. The teeth 170 preferably have an involute profile in which the profile of the teeth 170 curve inwardly near the tip. The involute profile of the teeth 170 advantageously allows the track 60 or apertures 174 to follow the profile of the teeth 170, and thus promote proper seating between the track 60 and the teeth 170. In addition, the teeth 170 and apertures 174 laterally maintain the track 60 on the wheels 64 and 68.

While a separate drive wheel 64 has been described, it will be appreciated that the rear wheel 41 of the standard bicycle 14 can be configured as the drive wheel 64. In addition, the drive wheel 64 can have a plurality of different sized gears, similar to the rear wheel 41. Furthermore, either of the drive or bogie wheels 64 and 68 can have any appropriate configuration, such as multiple wire spokes extending from the axle to the rim, a few composite spokes, a single, solid disc spoke, etc.

A method for converting the standard bicycle 14 (FIG. 7) into a tracked cycle 18 (FIG. 1) includes removing the standard rear wheel 41 (FIG. 7) from the rear fork 38, and from the drive chain 56. The standard rear brakes (not shown) also may be removed from the rear fork 38. The track assembly 22 is coupled to the frame 34 or rear fork 38. The drive wheel 64 is coupled to the rear fork 38, preferably at the rear axle location 40, and operatively coupled to the drive chain 56, such as by looping the drive chain 56 around one of the gears on the drive wheel 64. The drive wheel 64 can have an axle that is secured to the rear fork 38 with a threaded rod and nuts, similar to the rear wheel 41. Preferably, the track 60 is looped about the drive wheel 64 prior to attachment to the rear fork 38. Alternatively, if the track is separable, the track can be looped around the wheels later. The arms 80 are secured to the rear fork 38 or frame 34. For example, the frame bracket 120 can be positioned adjacent the rear fork 38, and the upper and lower braces 124 and 126 (FIG. 5) located adjacent respective upper and lower portions of the rear fork 38. The upper and lower braces 124 and 126 can be secured to the frame bracket 120 to secure the rear fork 38 therebetween.

The track 60 can be looped about both the drive and bogie wheels 64 and 68. The teeth 170 are mated with the apertures 174 (FIG. 2) in the track 60. The tensioner 140 can be held or disengaged while the track 60 is looped about the wheels 64 and 68. After the track 60 is positioned, the tensioner 140 can be released or engaged to tension the track.

A hydraulic brake (not shown) can be attached to the frame 34 or handlebars 44 to engage the disc brake 160 (FIG. 2) on the drive wheel 64.

In addition, the standard front wheel 48 (FIG. 7) can be removed from the front fork 42 and replaced with the ski assembly 26. The standard front brake (not shown) also can be removed. The ski 100 can be coupled to the front fork 42 with the ski post 104. The lower mounting bracket 112 can be attached to the front axle location 46 similar to the front wheel, or with a threaded rod and nuts. The upper mounting bracket 114 can be attached to the front fork 42 above the lower mounting bracket 112, such as to the front brake location.

It will be appreciated that the kit 10 or track assembly 22 allows a standard bicycle 14 (FIG. 7) to be quickly and easily converted into a tracked vehicle 18. The kit 10 or track assembly 22 allows the user or rider to utilize the same frame 34 and other components for both the wheeled cycle or configuration, and the tracked cycle or configuration, thus saving the cost of having purchase two different vehicles. As stated above, the track assembly 22 can be provided on the frame 34 for a dedicated tracked vehicle 18. In addition, the bogie wheel 68 and compliant and resilient arms 80 facilitate use of the track assembly 22 or tracked vehicle 18 on the riding surface 30, such as snow, mud, sand, etc. The arms 80 exert a force against the bogie wheel 68 to maintain the track 60 or flat portion 72 thereof against the riding surface 30.

As illustrated in FIGS. 10-15, another kit 210 in accordance with the present invention is shown installed on a standard bicycle convert it into a tracked cycle or tracked vehicle 218. The kit 210 and tracked vehicle 218 are similar in many respects to those described above, and thus much of the above description applies to the present embodiment and will not be repeated. The bicycle 214 can be similar to that described above (FIG. 7) or can have a similar configuration as known in the art with a frame 234 (partially shown), a rear fork 38 and a front fork 42. The kit 210 can include a track assembly 222 and a ski assembly 226 that advantageously can be installed on the standard bicycle to create the tracked vehicle 218 with improved traction and/or buoyancy on a riding surface, such as snow, mud, sand, etc. The kit 210 allows a user or rider to use a single vehicle or bicycle for both wheeled and tracked applications.

The track assembly 222 includes a continuous track 260 movably disposed around a pair of opposite, spaced-apart wheels, including a drive wheel 264 and a bogie wheel 268. The drive wheel 264 can be formed by the rear wheel 41 of the bicycle, such as the rim of the rear wheel with the tire and tube removed. The drive wheel 264 turns or drives the track 260, while the bogie wheel 268 allows an elongated portion 272 (FIG. 11) of the track 260 to contact the riding surface. The elongated portion 272 of the track 260 increases the surface area of the track 260 contacting the riding surface to improve traction and buoyancy. The bogie wheel 268 is more rigidly coupled to the frame 234, the rear fork 38, or drive wheel 264 than that described above. In addition, the track assembly 222 can be removably coupled to the frame 234, rear fork 38 and/or rear wheel 41 so that the track assembly 222 can be selectively coupled and uncoupled from the bicycle 214 frame 234, rear fork 38, and/or rear wheel 41. Thus, the track assembly 222 can be selectively coupled to the frame to convert the standard bicycle 214 into the tracked cycle or vehicle 218.

The track 260 can include an interior protrusion 278 (FIG. 18) with a v-shaped cross-sectional shape. The protrusion 278 can be receivable in the rim of the drive wheel, and in the bogie wheel 268. The protrusion assists in maintaining the track on the wheels. In addition, the track 260 can include an exterior tread or the like as described above.

The bogie wheel 268 can be disposed rearward of, and spaced-apart from, the drive wheel 264. One or more arms 280 can couple the bogie wheel 268 to the frame 234. A pair of arms 280 can be coupled to and between the frame 234 and the bogie wheel 268, each one on an opposite side of the bogie wheel. The arms 280 have a first end attached to the frame 234 or rear fork 38, and a second end coupled to the bogie wheel 268. Thus, the bogie wheel 268 is attached to the frame 234 in a cantilever configuration. The bogie wheel 268 and arms 280 form a bogie assembly or apparatus for use with the track 260 or track assembly 222 of the tracked vehicle 218. The bogie wheel can have an axel slidably received in slots on the second ends of the arms and secured therein. A threaded fastener can extend from the axel of the bogie wheel and can be engagable by a nut or the like so that rotating the nut slides the axel within the slot to adjust the position the bogie wheel and tension the track. Alternatively, the axel of the bogie wheel can be threaded to receive a nut so that the arm is sandwiched between the nut and inner axel. In addition, the first ends of the arms can be selectively slidably with respect to the frame or rear fork to tension the track.

Figure 16:
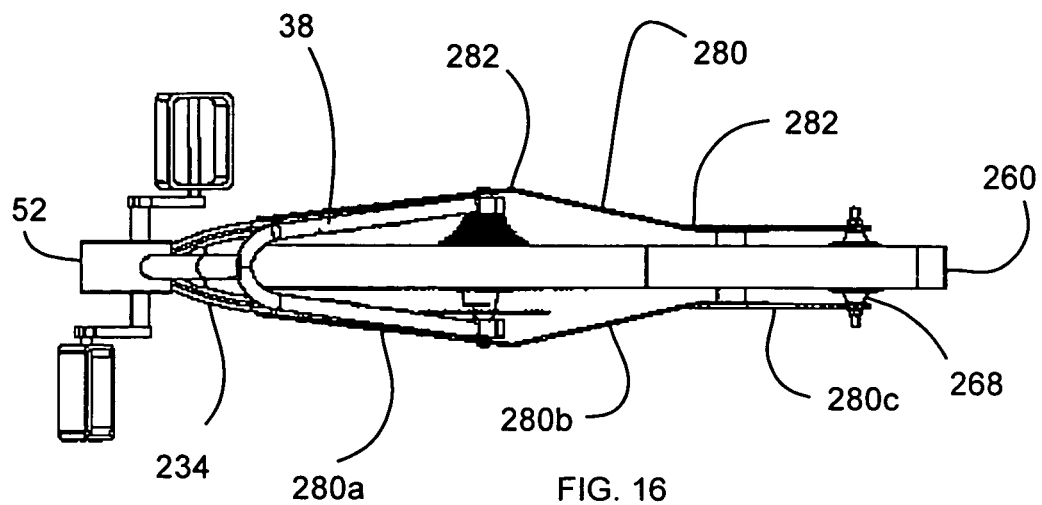
FIG. 16 is a top view of the track assembly of FIG. 10.
Figure 17:
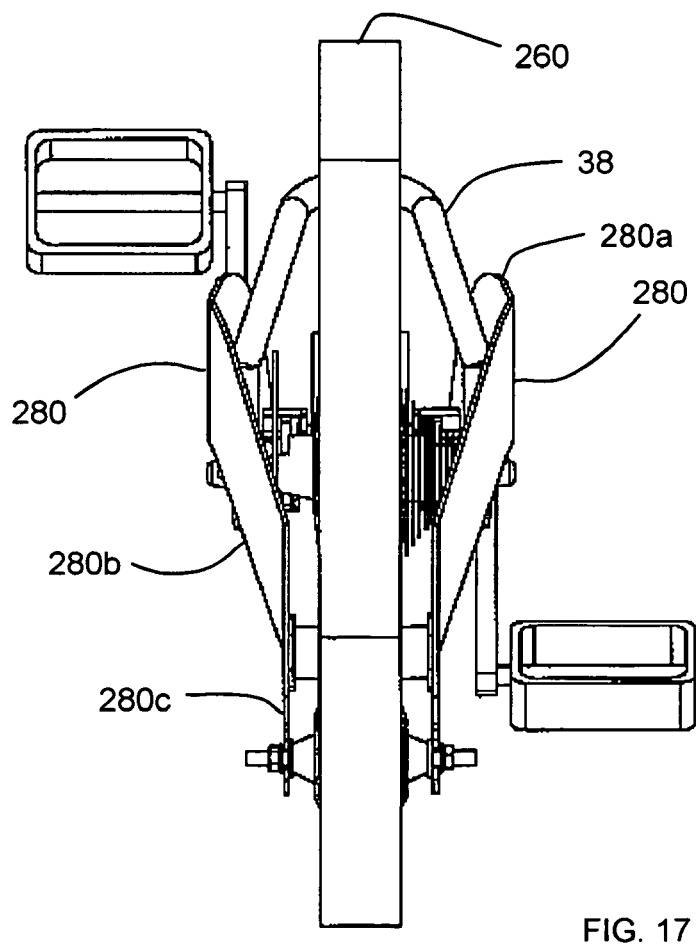
FIG. 17 is a rear view of the track assembly of FIG. 10.

The arms 280 are more rigid than those described above. The arms can include a material and a configuration that is more rigid, while still allowing limited pivotal potion of the bogie wheel. The arms 280 can be formed of a rigid material, such as metal, and can have a plate or sheet like configuration. The arms 280 themselves can extend rearward in a more horizontal orientation, while the plate or sheet like configuration can be oriented vertically. The arms 280 can have a curvature in a substantially horizontal plane, or bends 282 oriented vertically on the plate or sheet. The arms 280 can have three sections separated by the bends 282, including a mounting section 280a, a transition or extension section 280b, and a bogie section 280c, as shown in FIG. 16. The mounting section 280a can be attached to the frame 234 or rear forks 38, and thus can extend or flare outwardly from a front to a rear direction in order to match or mate with the rear forks 38. The transition or extension section 280b can extend between the mounting and bogie sections 280a and 280c, and can extend of flare back inwardly from a front to a rear direction. The bogie section 280c can extend from the transition or extension section 280b and attach to the bogie wheel 268, and can be straight or parallel along the bogie wheel 268. Thus, the arms 280 or transition or extension section 280b curves or extends inwardly.

The curvature or bends 282 can allow the arms to bend or flex vertically, and thus allow the bogie wheel 268 to move or pivot vertically with respect to the frame while the rigidity of the material of the arms tends to maintain the configuration and position of the bogie wheel. Thus, the curvature or bends allow the arms 280 to have a degree of compliance or resiliency. Thus, the bogie wheel 268 can move upward or downward in response to the riding surface, or riding conditions. For example, the bogie wheel 268 and track 260 can displace upwardly. In addition, the arms 280 can exert a force against the bogie wheel 268, and thus the track 260, to force the track 260 against the riding surface to improve traction. The curves or bends in the arms 280 can allow the arms or portion thereof to bend or deflect inwardly or outwardly as the arms bend or deflect downwardly or upwardly. Thus, the material of the arms provides more rigidity, while the configuration or shape of the arms allows for limited movement.

An intermediate arm support 284 (FIG. 13) can extend between and interconnect the pair of arms 280. The intermediate arm support 284 can be positioned between the drive wheel 264 and the bogie wheel 268. An intermediate track support 286 can be disposed between the drive wheel 264 and the bogie wheel 268. The intermediate track support 286 can engage a portion of the track 272 (FIG. 11) extending between the drive wheel 264 and the bogie wheel 268. The intermediate track support 286 can extend from the intermediate arm support 284, and can maintain the track against the riding surface. In addition, the intermediate track support 286 can include a leading edge 288 and an angled surface 290 angled at an acute angle with respect to the track. The leading edge 288 and angled surface 290 can act to displace or scrape snow, mud and other debris from the interior of the track 260, and resist the snow and the like from entering between the track 260 and bogie wheel 268. It has been found that snow and the like can get between the track 260 and bogie wheel 268 and interfere with performance or cause the track to come off the bogie wheel. Furthermore, the intermediate track support 286 can include a slot 292 (FIG. 18) with a v-shaped cross-sectional shape to receive the protrusion 278 of the track.

A pair of tabs can extend inwardly from the first end or attachment section 280a of each arm 280 to engage the frame 234 and transfer force from the arms to the frame. The tabs can include a forward and upper tab 294 and a rearward and lower tab 296. The forward and upper tab 294 can be positioned at a forward and higher position, while the rearward and lower tab 296 can be positioned at a rearward and lower position. A portion of the frame 234, or rear forks 38, can be received between the tabs. A top of the frame, or portion of the forks 38, can be engaged by the forward and upper tab 294, while a bottom of the frame, or portion of the forks 38, can be engaged by the rearward and lower tab 296.

The arms 280 or attachments sections 280a can be attached to the frame 234 or rear forks 38 in any appropriate manner. For example, apertures 298 can be formed in the arms 280 to receive fasteners, such as bolts. A u-bolt can extend around a portion of the rear forks 38 and through the apertures 298. Nuts can be threaded onto the ends of the u-bolt to secure the arms to the frame or rear fork. As another example, a mounting plate can be disposed on the inside of the rear forks and coupled to the arms by bolts, such that the rear forks are sandwiched between an arm on the outside and a mounting plate on the inside.

The arms 280 or attachment section 280a can have a height sized to extend across the entire rear fork 38, or across both upper and lower members of the rear fork. In addition, the attachment section 280a of the arms 280 can have a length to extend substantially along a length of the rear fork. Thus, the arms 290 or attachment section 280a can abut to a substantial portion of the rear fork 38 for stability.

The tracked vehicle 218 can have two or more configurations, similar to those described above, including a wheeled configuration (FIG. 7) and a tracked configuration. In the wheeled configuration, the vehicle can be configured as a standard bicycle with the rear wheel 41 coupled to the rear fork 38 at the rear axle location 40, and coupled to the drive chain of the drive assembly 50. In addition, the front wheel can be coupled to the front fork 42 at the front axle location.

In the tracked configuration, the track assembly 222 is coupled to the frame 234 or rear fork 38. The track 260 can be operatively coupled to or disposed around the drive wheel 264. The drive wheel 264 can be the rear wheel 41 with the tire and rim removed. In addition, the ski 300 or ski assembly 226 can be coupled to the front fork 42.

A method for converting the standard bicycle into a tracked cycle 218 includes removing the standard rear wheel 41 from the rear fork 38, and from the drive chain. The track assembly 222 is coupled to the frame 234 or rear fork 38. The tire and tube can be removed from the rear wheel 41 to form the drive wheel 264. The track 260 can be looped around the drive wheel 264 to form the track assembly. The drive wheel 264 is coupled to the rear fork 38, at the rear axle location 40, and operatively coupled to the drive chain. The arms 280 are secured to the rear fork 38 or frame 234. In addition, the standard front wheel can be removed from the front fork 42 and replaced with the ski assembly 226. The ski 300 can be coupled to the front fork 42.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A kit for converting a standard bicycle into a tracked cycle, the kit comprising:
   a) a drive wheel configured to be coupled to a frame of the standard bicycle, and configured to be operatively coupled to a drive of the standard bicycle;

b) a pair of arms each having a first end configured to be coupled to the frame of the standard bicycle, and a second end configured to extend rearward from the frame, each arm further including:
  i) a forward and upper tab, extending inwardly from a forward and higher position; and
  ii) a rearward and lower tab, extending inwardly from a rearward and lower position; and
  iii) the tabs being configured to receive at least a portion of the frame therebetween with the forward and upper tab engaging a top of the frame at a more forward position and the rearward and lower tab engaging a bottom of the frame at a more rearward position;
c) a bogie wheel, coupled to the second end of the arm and located rearward of the drive wheel; and
d) a continuous track, movably disposed around the drive and bogie wheels; and
e) the arms attaching the bogie wheel to the frame in a cantilever configuration.

2. A kit in accordance with claim 1, wherein each arm has a bend so that the arm extends inwardly to allow the arm to bend vertically.

3. A kit in accordance with claim 1, wherein the bogie wheel pivots with respect to the frame, and the arms are bendable as the bogie wheel pivots.

4. A kit in accordance with claim 1, wherein the track includes a v-shaped cross-sectional shape receivable in the drive wheel and the bogie wheel.

5. A kit in accordance with claim 1, further comprising an intermediate track support, disposed between the drive wheel and the bogie wheel, and engaging a portion of the track extending between the drive wheel and the bogie wheel.

6. A kit in accordance with claim 1, further comprising an intermediate arm support, interconnecting the pair of arms at a position between the drive wheel and the bogie wheel.

7. A kit in accordance with claim 1, wherein the arms are sized to engage a substanial portion of a rear fork of the standard bicycle, including both upper and lower members of the rear fork.

8. A kit in accordance with claim 1, further comprising:
  a) a ski configured to be coupled to a front fork of the standard bicycle.

9. A human powered vehicle apparatus having both wheeled and tracked configurations, comprising:
  a) a frame having a seat and a rear fork;
  b) a front fork and a handle bar, attached to one another and pivotally coupled to the frame;
  c) a drive assembly, coupled to the frame, including:
    i) a peddle gear, rotatably coupled to the frame, having peddles to turn the peddle gear; and
    ii) a drive chain, movably disposed around the peddle gear;
  d) a rear wheel, removably attachable to the rear fork of the frame, and operatively attachable to the drive chain;
  e) a front wheel, removably attachable to the front fork of the frame;
  f) a track assembly, removably attachable to the frame, including:
    i) a bogie wheel, located rearward of, and spaced apart from, the drive wheel and movably attachable to the frame;
    ii) a continuous track, movably disposed around the rear and bogie wheels; and
    iii) a pair of arms, coupled to and between the frame and the bogie wheel on opposite sides thereof, each arm further including: a forward and upper tab, extending inwardly from a forward and higher position, and a rearward and lower tab, extending inwardly from a rearward and lower position, and the tabs being configured to receive at least a portion of the frame therebetween with the forward and upper tab engaging a top of the frame at a more forward position and the rearward and lower tab engaging a bottom of the frame at a more rearward position; and
  g) a ski, removably attachable to the front fork; and
  h) the apparatus having at least two configurations, including:
    i) a wheeled configuration in which the track assembly is uncoupled from the frame; and
    ii) a tracked configuration in which the track assembly is coupled to the frame.

10. An apparatus in accordance with claim 9, wherein each arm has a bend so that the arm extends inwardly to allow the arm to bend vertically.

11. An apparatus in accordance with claim 9, wherein the bogie wheel pivots with respect to the frame, and the arms are bendable as the bogie wheel pivots.

12. An apparatus in accordance with claim 9, wherein the track includes a v-shaped cross-sectional shape receivable in the drive wheel and the bogie wheel.

13. An apparatus in accordance with claim 9, further comprising an intermediate track support, disposed between the drive wheel and the bogie wheel, and engaging a portion of the track extending between the drive wheel and the bogie wheel.

14. An apparatus in accordance with claim 9, further comprising an intermediate arm support, interconnecting the pair of arms at a position between the drive wheel and the bogie wheel.

15. An apparatus in accordance with claim 9, wherein the arms are sized to engage a substantial portion of a rear fork of the standard bicycle, including both upper and lower members of the rear fork.

16. An apparatus in accordance with claim 9, wherein:
  a) the wheeled configuration further includes the front wheel coupled to the front fork and the ski uncoupled from the front fork; and
  b) the tracked configuration further includes the ski coupled to the front fork and the front wheel uncoupled from the front fork.

17. A method for converting a standard bicycle into a tracked cycle, comprising:
  a) removing a standard rear wheel from a rear fork of the standard bicycle;
  b) removing a tire and a tube from the standard rear wheel to create a drive wheel;
  c) looping a track around the drive wheel;
  d) disposing the drive wheel on the rear fork; and
  e) securing a pair of arms to both sides of the rear fork, the arms extending rearward to a bogie wheel with the track looped around the bogie wheel.

18. A method in accordance with claim 17, further comprising:
  a) removing a standard front wheel from a front fork of the standard bicycle; and
  b) coupling a ski to the front fork.

* * * * *